(12) United States Patent
Foley et al.

(10) Patent No.: US 8,020,884 B1
(45) Date of Patent: Sep. 20, 2011

(54) BICYCLE HANDLEBAR STEM ASSEMBLY

(75) Inventors: Aaron J. Foley, San Jose, CA (US);
Dennis John Wrobleski, San Jose, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/036,884

(22) Filed: Feb. 28, 2011

(51) Int. Cl.
*B62K 21/16* (2006.01)
(52) U.S. Cl. ....................................... 280/279; 74/551.1
(58) Field of Classification Search .................. 280/279, 280/280, 288.4; 74/551.1
See application file for complete search history.

(56) References Cited

U.S. PATENT DOCUMENTS

| 4,616,949 | A | * | 10/1986 | Kellner | 403/104 |
| 5,881,606 | A | * | 3/1999 | Roddy | 74/551.3 |
| 6,058,800 | A | | 5/2000 | Giard | |
| 7,353,731 | B2 | | 4/2008 | Lin | |
| 7,407,176 | B2 | | 8/2008 | McJunkin et al. | |

* cited by examiner

*Primary Examiner* — Tony H. Winner
(74) *Attorney, Agent, or Firm* — Michael Best & Friedrich LLP

(57) ABSTRACT

A bicycle including a main frame, a front fork rotationally coupled to the main frame, a rear wheel rotationally coupled to the main frame, a front wheel rotationally coupled to the front fork, a handlebar, and a stem assembly coupling the handlebar to the front fork. The stem assembly includes a stem base coupled to the front fork, a face plate coupled to the stem base with the handlebar sandwiched between the face plate and the stem base, and an auxiliary retention system that holds the face plate engaged with the stem base.

19 Claims, 3 Drawing Sheets

BICYCLE HANDLEBAR STEM ASSEMBLY

BACKGROUND

The present invention relates generally to bicycles, and more specifically to systems for mounting handlebars.

Bicycles commonly have a main frame and a front fork pivotally secured to the main frame. A rear wheel is typically rotationally secured to the main frame, and a front wheel is typically rotationally secured to the front fork. Steering control of the bicycle is provided by a handlebar that is usually secured to the front fork through a handlebar stem assembly. Such assemblies commonly include a stem base coupled to the front fork, a face plate coupled to the stem base, and the handlebar sandwiched between the stem base and the face plate. The face plate is typically coupled to the stem base using fasteners such as screws, whereby the face plate and the handlebar must be held into position relative to the stem base until the screws are installed.

SUMMARY OF THE INVENTION

The present invention provides a handlebar stem assembly that facilitates easier assembly of the handlebar to the stem. Specifically, the invention provides a bicycle including a main frame, a front fork rotationally coupled to the main frame, a rear wheel rotationally coupled to the main frame, a front wheel rotationally coupled to the front fork, a handlebar, and a stem assembly coupling the handlebar to the front fork. The stem assembly includes a stem base (e.g., including a recess in which the handlebar is positioned) coupled to the front fork, a face plate (e.g., including a recess in which the handlebar is positioned) coupled to the stem base with the handlebar sandwiched between the face plate and the stem base, and an auxiliary retention system that holds the face plate coupled to the stem base. Preferably, the face plate, handlebar and stem base are sandwiched together by a fastening device (e.g., a threaded fastener).

In one embodiment, the auxiliary retention system comprises a latch secured to one of the stem base and the face plate, and a catch secured to the other of the stem base and the face plate. In this embodiment the latch engages the catch to maintain coupling of the face plate to the stem base.

In a preferred embodiment, the latch is supported by the face plate and the catch is supported by the stem base. For example, the catch can comprise an upper catch member on an upper portion of the stem base and a lower catch member on a lower portion of the stem base, and the latch can comprise an upper latch member on an upper portion of the face plate and a lower latch member on a lower portion of the face plate. In this example, the upper latch member engages the upper catch member, and the lower latch member engages the lower catch member. If desired, the latch can further comprise a U-shaped portion that connects the upper latch member to the lower latch member. In this embodiment, the U-shaped portion can wrap around the face plate, and the upper and lower latch members can extend away from the face plate toward the stem base.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
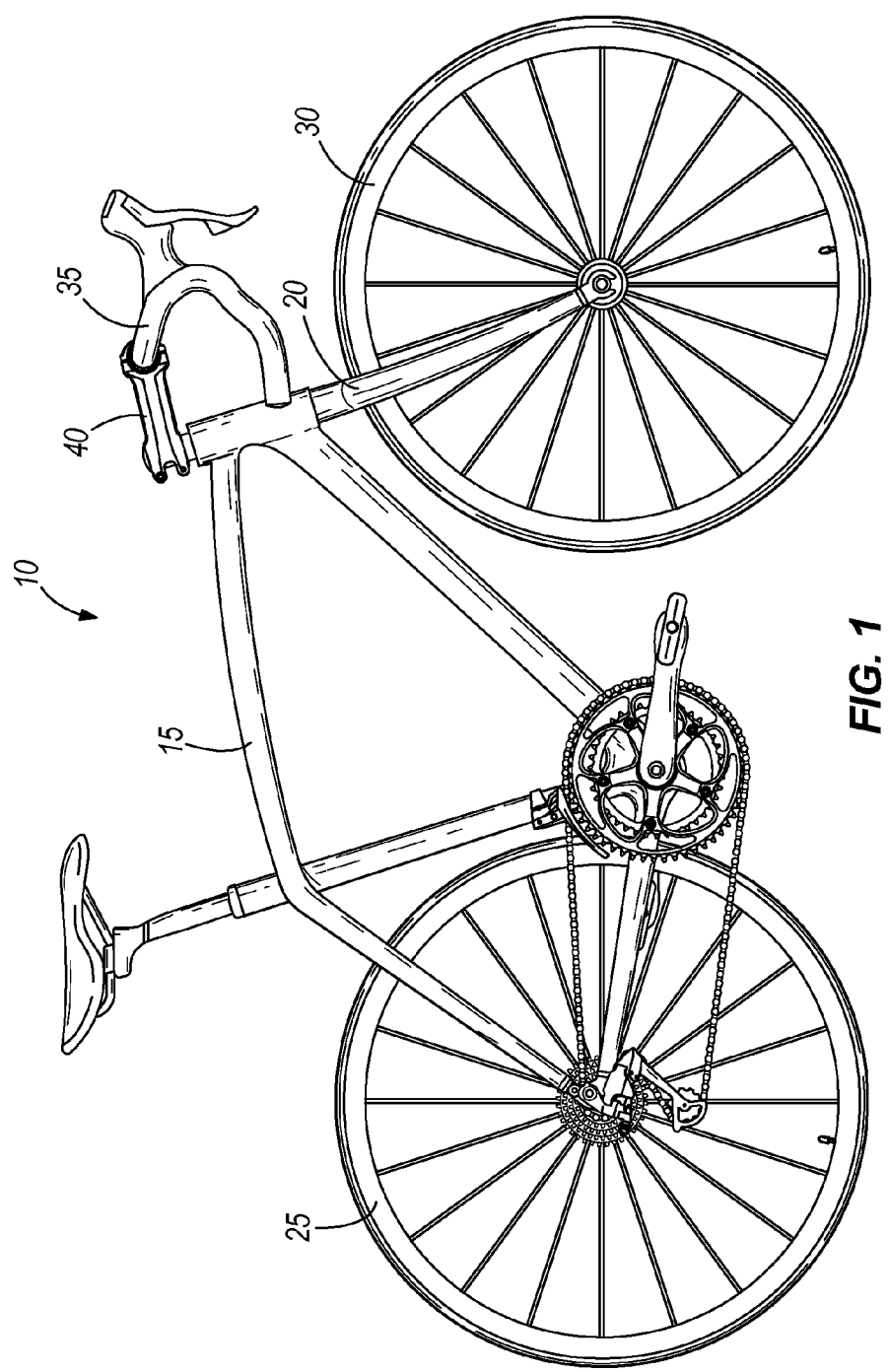
FIG. 1 is a perspective view of a bicycle embodying the present invention.

FIG. 1 illustrates a bicycle 10 including a main frame 15 and a front fork 20 rotationally coupled to the main frame 15. A rear wheel 25 is rotationally coupled to the main frame 15. A front wheel 30 is rotationally coupled to the front fork 20. A handlebar 35 is coupled to the front fork 20 by a stem assembly 40.

Figure 2:
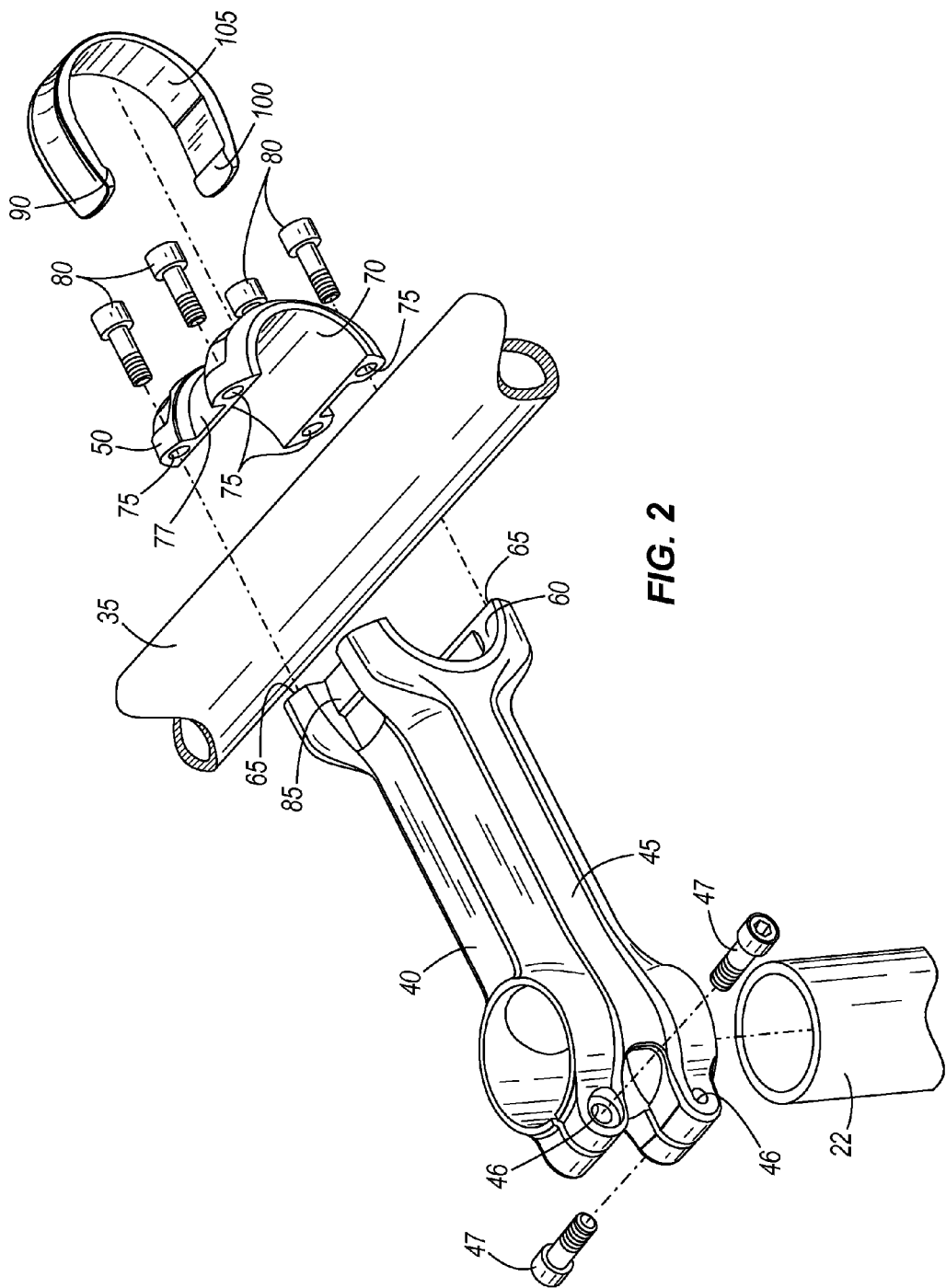
FIG. 2 is an exploded view of a front portion of the bicycle illustrated in FIG. 1, including a handlebar stem assembly.
Figure 3:
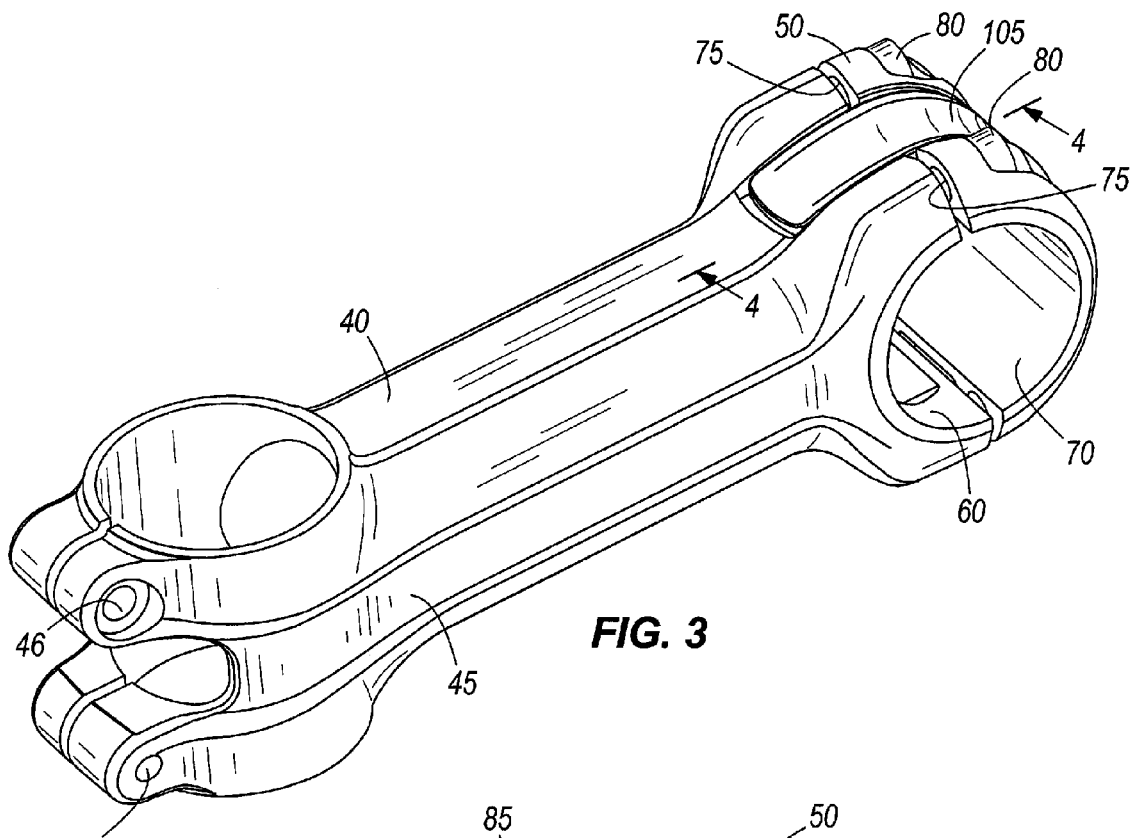
FIG. 3 is an assembled view of the handlebar stem assembly in FIG. 2.

Referring to FIGS. 2 and 3, the stem assembly 40 includes a stem base 45 coupled to a steerer tube 22 of the front fork 20, a face plate 50 coupled to the stem base 45 with the handlebar 35 sandwiched between the face plate 50 and the stem base 45, and an auxiliary retention system that holds the face plate 50 engaged with the stem base 45. The stem base 45 includes two threaded apertures 46 and is held into position on the steerer tube 22 with two threaded fasteners 47 that are received in the threaded apertures 46. The stem base 45 includes a recess 60 for receiving the handlebar 35 and four threaded apertures 65. The face plate 50 includes a recess 70 for receiving the handlebar 35, four apertures 75 aligned with the four threaded apertures 65, and an annular groove 77 on an outer surface of the face plate 50. Four threaded fasteners 80 are positioned through the apertures 75 and into the threaded apertures 65 to secure the handlebar 35 in position relative to the stem assembly 40.

Figure 4:
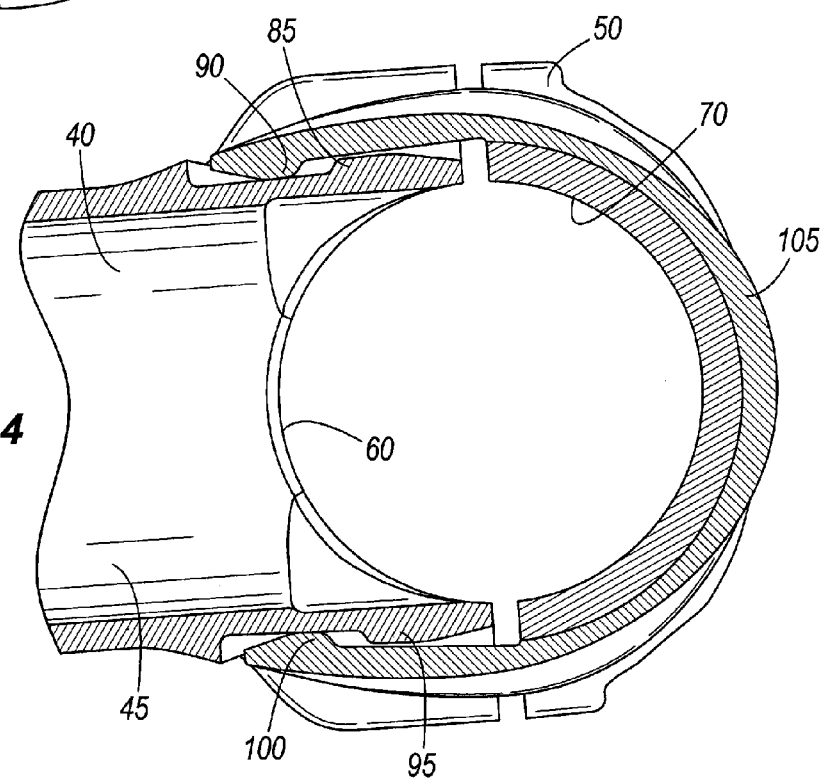
FIG. 4 is a cross-sectional view of the handlebar stem assembly taken generally along line 4-4 in FIG. 3.

Referring to FIGS. 2-4, the illustrated auxiliary retention system includes a latch secured to the face plate 50 and a catch secured to the stem base 45. The latch includes an upper latch member 90, a lower latch member 100, and a U-shaped portion 105 connecting the upper latch member 90 to the lower latch member 100. The latch is dimensioned to wrap around the outer surface of the face plate 50 and rest within the annular groove 77. While the illustrated latch is shown and described as being separate from the face plate 50, it should be understood that the two parts could be rigidly secured together (e.g., fastened, welded, bonded, etc) or formed integrally.

The upper and lower latch members 90, 100 are designed to flex slightly without breaking so that the latch members 90, 100 can deflect over and engage the catch. In the illustrated embodiment, the entire latch is made of a flexible, resilient material such as nylon plastic, fiberglass, or carbon fiber.

The catch includes an upper catch member 85 and a lower catch member 95. The upper catch member 85 is formed integrally with an upper portion of the stem base 45 and is dimensioned to receive the upper latch member 90. The lower catch member 95 is formed integrally with a lower portion of the stem base 45 and is dimensioned to receive the lower latch member 100. While the illustrated catch is shown and described as being integrally formed with the stem base 45, it should be understood that the two parts could be separate parts that are secured together (e.g., fastened, welded, bonded, etc). Furthermore, it should be appreciated that, in its broadest sense, the positions of the catch and latch could be reverse, with the catch on the face plate 50 and the latch on the stem base 45.

In operation, the handlebar 35 is positioned in the recess 60 of the stem base 45. The face plate 50 is then positioned over the handlebar 35 and the upper and lower latch members 90, 100 are snapped into the corresponding upper and lower catch members 85, 95. The retention force created by the auxiliary retention system 55 holds the handlebar 35 sandwiched between the face plate 50 and the stem base 45. The threaded fasteners 80 are then installed through the face plate 50 and into the stem base 45 to facilitate securing the handlebar to the stem assembly 40.

Various features and advantages of the invention are set forth in the following claims.

What is claimed is:

1. A bicycle comprising:
   a main frame;
   a front fork rotationally coupled to the main frame;
   a rear wheel rotationally coupled to the main frame;
   a front wheel rotationally coupled to the front fork;
   a handlebar; and
   a stem assembly coupling the handlebar to the front fork, the stem assembly comprising:
   a stem base coupled to the front fork;
   a face plate coupled to the stem base by a fastening device with the handlebar sandwiched between the face plate and the stem base; and
   an auxiliary retention bracket that holds the face plate coupled to the stem base when the fastening device is removed.

2. The bicycle as claimed in claim 1, wherein the stem base includes a recess in which the handlebar is positioned.

3. The bicycle as claimed in claim 1, wherein the face plate includes a recess in which the handlebar is positioned.

4. The bicycle as claimed in claim 1, wherein the face plate, handlebar and stem base are sandwiched together by the fastening device.

5. The bicycle as claimed in claim 4, wherein the fastening device comprises a threaded fastener.

6. The bicycle as claimed in claim 1, wherein the auxiliary retention system comprises:
   a latch secured to one of the stem base and the face plate; and
   a catch secured to the other of the stem base and the face plate, wherein the latch engages the catch to maintain engagement of the face plate to the stem base.

7. The bicycle as claimed in claim 6, wherein the latch is supported by the face plate and the catch is supported by the stem base.

8. The bicycle as claimed in claim 7, wherein the catch comprises an upper catch member on an upper portion of the stem base and a lower catch member on a lower portion of the stem base, wherein the latch comprises an upper latch member on an upper portion of the face plate and a lower latch member on a lower portion of the face plate, and wherein the upper latch member engages the upper catch member, and the lower latch member engages the lower catch member.

9. The bicycle as claimed in claim 8, wherein the latch further comprises a U-shaped portion that connects the upper latch member to the lower latch member.

10. The bicycle as claimed in claim 9, wherein the U-shaped portion wraps around the face plate and the upper and lower latch members extend away from the face plate toward the stem base.

11. A bicycle stem assembly coupling a bicycle handlebar to a bicycle front fork, the stem assembly comprising:
    a stem base adapted to be coupled to the front fork;
    a face plate coupled to the stem base by a fastening device and adapted to sandwich the handlebar between the face plate and the stem base; and
    an auxiliary retention bracket that holds the face plate coupled to the stem base when the fastening device is removed.

12. The bicycle stem assembly as claimed in claim 11, wherein the stem base includes a recess adapted to receive the handlebar.

13. The bicycle stem assembly as claimed in claim 11, wherein the face plate includes a recess adapted to receive the handlebar.

14. The bicycle stem assembly as claimed in claim 11, wherein the fastening device comprises a threaded fastener.

15. The bicycle stem assembly as claimed in claim 11, wherein the auxiliary retention system comprises:
    a latch secured to one of the stem base and the face plate; and
    a catch secured to the other of the stem base and the face plate, wherein the latch engages the catch to maintain engagement of the face plate to the stem base.

16. The bicycle stem assembly as claimed in claim 15, wherein the latch is supported by the face plate and the catch is supported by the stem base.

17. The bicycle stem assembly as claimed in claim 16, wherein the catch comprises an upper catch member on an upper portion of the stem base and a lower catch member on a lower portion of the stem base, wherein the latch comprises an upper latch member on an upper portion of the face plate and a lower latch member on a lower portion of the face plate, and wherein the upper latch member engages the upper catch member, and the lower latch member engages the lower catch member.

18. The bicycle stem assembly as claimed in claim 17, wherein the latch further comprises a U-shaped portion that connects the upper latch member to the lower latch member.

19. The bicycle stem assembly as claimed in claim 18, wherein the U-shaped portion wraps around the face plate and the upper and lower latch members extend away from the face plate toward the stem base.

\* \* \* \* \*